US009753784B2

(12) United States Patent
Nassaur et al.

(10) Patent No.: US 9,753,784 B2
(45) Date of Patent: Sep. 5, 2017

(54) CLOUD DELIVERY PLATFORM

(71) Applicant: AT&T Intellectual Property I, L.P., Atlanta, GA (US)

(72) Inventors: Douglas Nassaur, Duluth, GA (US); James Paul Fox, Dallas, TX (US); Rene Glover, Pelham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 186 days.

(21) Appl. No.: 14/091,711

(22) Filed: Nov. 27, 2013

(65) Prior Publication Data

US 2015/0149634 A1   May 28, 2015

(51) Int. Cl.
*G06F 15/173* (2006.01)
*G06F 9/50* (2006.01)
*H04L 12/911* (2013.01)
*H04L 12/24* (2006.01)

(52) U.S. Cl.
CPC ........ *G06F 9/5072* (2013.01); *H04L 41/0806* (2013.01); *H04L 47/70* (2013.01)

(58) Field of Classification Search
CPC ................. H04L 47/70; H04L 41/0806; H04L 29/08288
See application file for complete search history.

(56) References Cited

U.S. PATENT DOCUMENTS

| 5,475,819 A | 12/1995 | Miller et al. |
| 6,058,426 A | 5/2000 | Godwin et al. |
| 6,880,002 B2 | 4/2005 | Hirschfeld et al. |
| 6,990,666 B2 | 1/2006 | Hirschfeld et al. |
| 7,437,706 B2 | 10/2008 | Woodgeard |
| 7,802,238 B2 | 9/2010 | Clinton |
| 8,014,308 B2 | 9/2011 | Gates et al. |

(Continued)

FOREIGN PATENT DOCUMENTS

| CN | 102655532 A | 9/2012 |
| JP | 2012208747 A | 10/2012 |

(Continued)

OTHER PUBLICATIONS

Brady, Kevin F., "Cloud Computing—Is It Safe for IP," Portfolio Media, Inc., http://www.law360.com/print_article/113709, Aug. 27, 2009, 8 pages.

(Continued)

*Primary Examiner* — Dhairya A Patel
(74) *Attorney, Agent, or Firm* — Hartman & Citrin LLC

(57) ABSTRACT

Concepts and technologies disclosed herein are directed to a cloud delivery platform. The cloud delivery platform can publish a cloud deployable offering. The cloud delivery platform can order, from a cloud orchestrator, one or more resources to be utilized by the cloud deployable offering. The cloud delivery platform can provision the cloud deployable offering on the resource(s). The cloud delivery platform can manage the cloud deployable offering to ensure that the cloud deployable offering meets a level of service. The cloud delivery platform can monitor one or more components of the cloud delivery platform to determine whether an event has occurred, and in response to determining that an event has occurred, the cloud delivery platform can broadcast the event.

15 Claims, 12 Drawing Sheets

(56) References Cited

U.S. PATENT DOCUMENTS

| | | | |
|---|---|---|---|
| 8,015,547 B2 | 9/2011 | Harvey et al. | |
| 8,131,844 B2 | 3/2012 | Moore et al. | |
| 8,250,213 B2 | 8/2012 | Glover et al. | |
| 8,417,938 B1* | 4/2013 | Considine | H04L 41/12 713/151 |
| 8,438,286 B2 | 5/2013 | Glover et al. | |
| 8,495,611 B2 | 7/2013 | Mccarthy et al. | |
| 8,997,078 B2* | 3/2015 | Spivak | G06F 9/5055 717/168 |
| 9,158,734 B1* | 10/2015 | Prabhakara | H04L 67/1097 |
| 2003/0051021 A1 | 3/2003 | Hirschfeld et al. | |
| 2005/0138204 A1 | 6/2005 | Iyer et al. | |
| 2005/0138625 A1 | 6/2005 | Carroll et al. | |
| 2006/0085785 A1 | 4/2006 | Garrett | |
| 2008/0034365 A1 | 2/2008 | Dahlstedt | |
| 2008/0080396 A1 | 4/2008 | Meijer et al. | |
| 2008/0080552 A1 | 4/2008 | Gates et al. | |
| 2008/0082546 A1 | 4/2008 | Meijer et al. | |
| 2008/0209451 A1 | 8/2008 | Michels et al. | |
| 2009/0183168 A1 | 7/2009 | Uchida | |
| 2010/0058328 A1 | 3/2010 | DeHaan | |
| 2011/0047540 A1 | 2/2011 | Williams et al. | |
| 2011/0087783 A1 | 4/2011 | Annapureddy et al. | |
| 2011/0126168 A1 | 5/2011 | Ilyayev | |
| 2011/0126197 A1 | 5/2011 | Larsen et al. | |
| 2011/0161912 A1 | 6/2011 | Eteminan et al. | |
| 2011/0296023 A1* | 12/2011 | Ferris | G06F 9/541 709/226 |
| 2012/0180029 A1 | 7/2012 | Hill et al. | |
| 2012/0185913 A1 | 7/2012 | Martinez et al. | |
| 2012/0278454 A1 | 11/2012 | Stewart et al. | |
| 2012/0331441 A1 | 12/2012 | Adamson | |
| 2013/0073614 A1 | 3/2013 | Shine et al. | |
| 2013/0159892 A1 | 6/2013 | Suraj et al. | |
| 2013/0185699 A1 | 7/2013 | Oguma et al. | |
| 2013/0191823 A1 | 7/2013 | Davidson et al. | |
| 2013/0234853 A1 | 9/2013 | Kazerouni | |
| 2013/0239089 A1 | 9/2013 | Eksten et al. | |
| 2013/0246626 A1 | 9/2013 | Glover et al. | |
| 2013/0254755 A1* | 9/2013 | Yousouf | G06F 8/60 717/170 |
| 2013/0275623 A1* | 10/2013 | Stoilov | G06F 8/61 709/246 |
| 2013/0346945 A1* | 12/2013 | Yousouf | G06F 8/36 717/121 |
| 2014/0280961 A1* | 9/2014 | Martinez | H04L 41/5054 709/226 |

FOREIGN PATENT DOCUMENTS

| | | | |
|---|---|---|---|
| WO | WO 2013072925 A2 | 5/2013 | |
| WO | WO 2013133922 A1 | 9/2013 | |

OTHER PUBLICATIONS

"Amazon Elastic Computing Cloud," http://aws.amazon.com/ec2, retrieved from the Internet on Dec. 23, 2009, 8 pages.

Armbrust et al., "Above the Clouds: A Berkeley View of Cloud Computing," Technical Report UCB/EECS-2009-28, EECS Department, University of California, Berkeley, February Technical Report No. UCB/EECE-2009-28, http://www.eecs.berkeley.edu/Pubs/TechRpts/2009/EECS-2009-28.html, Feb. 10, 2009, 25 pages.

Clark et al., "Live Migration of Virtual Machines," In Proceedings of NSDA, http://www.cl.cam.ac.uk/research/srg/netos/papers/2005-migration-nsdi-pre.pdf, May 2005, 14 pages.

Duffield et al., "Resource management with hoses: point-to-cloud services for virtual private networks," IEEE ACM Transactions on Networking, 2002, 16 pages.

Cohen, Reuven, "Elasticvapor Blog: Virtual PrivateCloud," www.elasticvapor.com/2008/05/virtual-private-cloud-vpc.htm, May 8, 2008, 2 pages.

Google, "Google App Engine," http://code.google.com/appengine/, retrieved from the Internet on Dec. 23, 2009, 4 pages.

Nelson et al., "Fast Transparent Migration for Virtual Machines," In ATEC '05 Proceedings of the annual conference on USENIX Annual Technical Conference, 2005, 4 pages.

Ramakrishnan et al., "Live Data Center Migration Across WANs: A Robust Cooperative Context Aware Approach," in INM '07: Proceedings of the SIGCOMM workshop on Internet network management, Aug. 27-31, 2007, 6 pages.

Ruth et al., "Autonomic Live Adaptation of Virtual Computational Environments in a Multi-Domain Infrastructure," in ICAC '06: Proceedings of the 2006 IEEE International Conference of Autonomic Computing, 2006, 10 pages.

Sundararaj et al., "Towards Virtual Networks for Virtual Machine Grid Computing," in VM '04: Proceedings of the 3rd conference on Virtual Machine Research And Technology Symposium, 2004, 14 pages.

U.S. Office Action dated Nov. 17, 2011 in U.S. Appl. No. 12/619,301.

U.S. Notice of Allowance dated Apr. 26, 2012 in U.S. Appl. No. 12/619,301.

U.S. Notice of Allowance dated Jun. 25, 2012 in U.S. Appl. No. 12/619,301.

U.S. Notice of Allowance dated Oct. 15, 2012 in U.S. Appl. No. 13/567,405.

Christina Vecchiola et al., "High-Performance Cloud Computing: A View of Scientific Applications," IEEE 2009, 13 Pages (4-16).

Liang Zhao et al., "Evaluating Cloud Platform Architecture with the CARE framework," Asia Pacific Software Engineering Conference, 2010 IEEE, 10 Pages (60-69).

Fan et al, "Scientific application deployment on Cloud: A Topology-Aware Method," Concurrency and Computation: Practice and Experience 2012, Published online in Wiley InterScience (www.interscience.wiley.com).

Calheiros et al, "CloudSim: A Toolkit for the Modeling and Simulation of Cloud Resource Management and Application Provisioning Techniques," Software: Practice and Experience, 41(1): 23-50,Wiley, Jan. 2011.

Zeng et al, "A SaaS Development Platform Based on Cloud Computing," TELKOMNIKA, vol. 11, No. 3, Mar. 2013, pp. 1646-1651.

\* cited by examiner

EXAMPLE CLOUD DEPLOYMENT MANIFEST 500

| CLOUD DEPLOYMENT ELEMENT | ROLE 502 | QUANTITY 504 | PACKAGES 506 508 |
|---|---|---|---|
| 1 | ADMIN | 1 | PKG1, PKG2, PKG3 |
| 2 | STAGE | 3 | PKG4, PKG5, PKG6, PKG7 |
| 3 | MASTER-1 | 1 | PKG8, PKG7, PKG9 |
| 4 | MASTER-2 | 1 | PKG10, PKG11, PKG5, PKG9 |
| 5 | MASTER-3 | 1 | PKG12, PKG9 |
| 6 | DATA NODE | 119 | PKG13, PKG14, PKG15, PKG16 |

| PROVISIONING TYPES ENABLED 510 | PROCESS 512 | IMAGE LOCATION 514 |
|---|---|---|
| INITIAL | STICK DEPLOY | STND |
| ELASTIC EVENT | SNAPSHOT RESTORE | STND |
| RECOVERY | SNAPSHOT RESTORE | STND |

| CLOUD DEPLOYMENT UNIT 516 | CPU/CORE 518 | MEMORY 520 | STORAGE 522 |
|---|---|---|---|
| 001-STANDARD NODE | 2 X 16 | 256 | 12 X 2 TB |
| 002-DATA NODE | 2 X 16 | 128 | 12 X 2 TB |

*FIG. 5*

CLOUD DELIVERY PLATFORM

BACKGROUND

Cloud computing can allow dynamically scalable, often virtualized resources to be provided as a service. Cloud computing can assure an appropriate level of resources are available to power software applications when and where the resources are needed in response to demand. As a result, cloud computing allows entities to respond quickly, efficiently and in an automated fashion to the rapidly changing business environment.

SUMMARY

Concepts and technologies disclosed herein are directed to a cloud delivery platform. The cloud delivery platform can publish a cloud deployable offering. The cloud delivery platform can define a cloud deployable offering using a blueprint framework. The blueprint framework can define the software and computer infrastructure a cloud deployable offering can utilize to function. The blueprint framework can identify each component of the cloud deployable offering, each components relationship to other components, the steps taken to deploy each component, the sequence that is to be followed to deploy the components, and one or more policies that govern each components behavior during operation. The cloud delivery platform can enable elastic scaling of cloud deployable offerings by detecting demand at the component level and taking the appropriate steps to automatically increase or decrease resources assigned to that component. The cloud delivery platform can order, from a cloud orchestrator, one or more resources to be utilized by the cloud deployable offering. The cloud delivery platform can provision the cloud deployable offering on the resource(s). The cloud delivery platform can provision the components of a cloud deployable offering using resources from multiple cloud orchestrators. The cloud delivery platform can understand the capabilities of each cloud orchestrator and the level of service required by individual components of a cloud deployable offering. The cloud delivery platform can manage the cloud deployable offering to ensure that the cloud deployable offering meets a level of service. The cloud delivery platform can monitor one or more components of the cloud deployable offering to determine whether an event has occurred, and in response to determining that an event has occurred, the cloud delivery platform can broadcast the event.

In some embodiments, the cloud delivery platform can manage the cloud deployable offering to ensure that the cloud deployable offering meets a level of service by detecting an event and responding to the event by performing a function to return the cloud deployable offering to the level of service. The function, in some embodiments, can include generating an order directed to the cloud orchestrator to order additional resources to return the cloud deployable offering to the level of service. In some other embodiments, the function can include installing a patch to the cloud deployable offering. In some other embodiments, the function can include upgrading the cloud deployable offering. In some other embodiments, the function can include relocating the cloud deployable offering from the resources to new resources and provisioning the cloud deployable offering on the new resources. In some other embodiments, the function can include performing a recovery deployment to return the cloud deployable offering to a previous state in which the level of service is met. In some other embodiments, the function can include re-provisioning the cloud deployable offering on the resources.

In some embodiments, the cloud delivery platform can publish the cloud deployable offering by identifying a cloud deployment element and a cloud deployment unit on which to deploy the cloud deployment element. The cloud delivery platform can also define a cloud deployment policy for the cloud deployment offering. The cloud delivery platform can also organize the cloud deployment element among other cloud deployment elements using a hierarchical and tiered sequence of relationship, dependency, and resourced data according to a unique scheme. The cloud delivery platform can also generate a cloud deployment manifest. The cloud deployment manifest can include an identifier for the cloud deployment element, an identifier for the cloud deployment unit, and the cloud deployment policy. The cloud delivery platform can consult the cloud deployment manifest to determine the resources to order from the cloud orchestrator. The cloud delivery platform can consult the cloud deployment manifest to select the appropriate cloud orchestrator from which to request one or more resources.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a block diagram illustrating a cloud deployment manifest, according to an illustrative embodiment.

DETAILED DESCRIPTION

Figure 1:
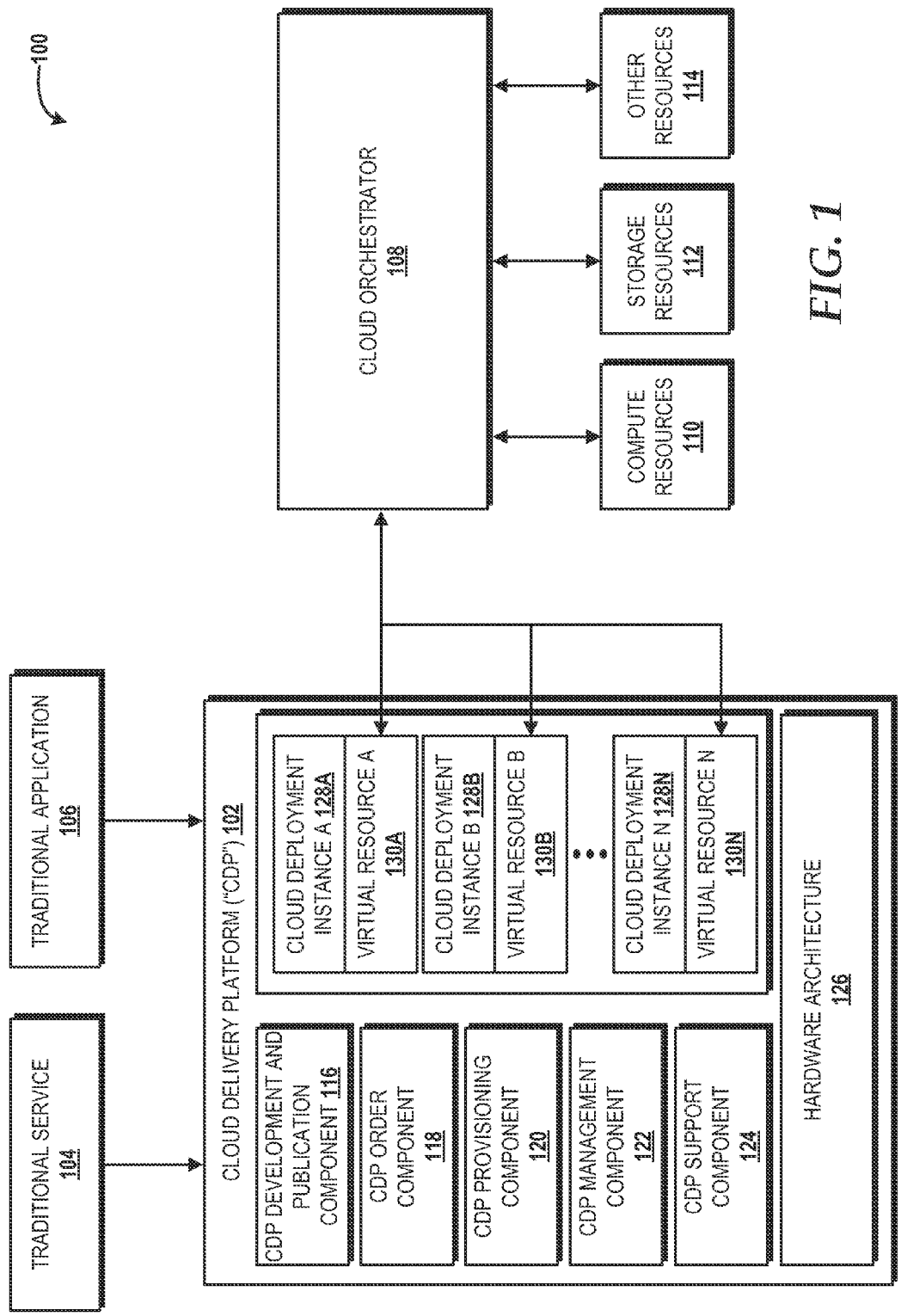
FIG. 1 is a block diagram illustrating aspects of an illustrative operating environment for implementing the various concepts and technologies disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of a CDP will be presented.

Referring now to FIG. 1, aspects of an operating environment 100 for implementing various embodiments of the concepts and technologies disclosed herein for a CDP will be described. The illustrated operating environment 100 includes a CDP 102. The CDP 102 can be used to refactor a traditional service 104 and/or a traditional application 106 into a cloud deployable offering ("CDO"). The traditional service 104 can be any service that a business or other entity desires to deploy within a cloud computing environment. The traditional application 106 can be any application that a business or other entity desires to deploy within a cloud computing environment.

The CDP 102 can be in communication with a cloud orchestrator 108 that orchestrates the use of one or more compute resources 110, one or more storage resources 112, and/or one or more other resources 114 to deploy the traditional service 104 and/or the traditional application 106 within a cloud computing environment as a CDO. Although a single cloud orchestrator 108 is shown in FIG. 1, multiple cloud orchestrators 108 may be utilized. Moreover, the compute resources 110, the storage resources 112, and/or the other resources 114 can be dedicated to a single cloud orchestrator 108 or shared among two or more cloud orchestrators 108. As such, the illustrated embodiment that includes a single cloud orchestrator 108 in communication with one or more compute resources 110, one or more storage resources 112, and/or one or more other resources 114 is merely illustrative, and should not be construed as being limiting in any way.

The compute resources 110 can include physical and/or virtualized resources that alone or in some combination facilitate computational processes for providing a CDO offering via the CDP 102. In some embodiments, the compute resources 110 include processing resources, memory resources, graphics resources, network resources, input resources, output resources, combinations thereof, and the like. The storage resources 112 can include physical and/or virtualized resources that alone or in some combination facilitate the storage of data for a CDO offering. In some embodiments, the storage resources 112 include hard disks, optical disks, flash memory drives, solid-state drives, combinations thereof, and the like. The other resources 114 can include any other physical and/or virtualized resources that can be utilized by the CDP 102 to provide a CDO offering.

The CDP 102 provides the facilities, intelligence, and automation to deploy and re-deploy software applications and components thereof to meet demand, thereby enabling the elastic scaling of functions as opposed to entire IT platforms. The CDP 102 can provide elastic scaling of cloud deployable offerings by detecting demand at the component level and taking the appropriate steps to automatically increase or decrease resources assigned to that component. The CDP 102 can provide real-time monitoring of software components that execute specific functions. The CDP 102 can monitor each instance of a function to detect excessive busy or low demand conditions in accordance with a thresholding algorithm. The CDP 102 can determine the appropriate course of action to scale instances of a function in response to changing demand conditions. In the event a threshold condition is detected, the CDP 102 can relocate the involved software closer to demand and can increase or decrease the amount of resources (e.g., the amount of compute resources 110, storage resources 112, and/or other resources 114) as appropriate. The CDP 102 is aware of the relationship of software components to each other and the resulting impacts these relationships have on quality and performance, and can make relocation decisions to maintain service level requirements.

The CDP 102 provides facilities to address all phases of a software development life cycle from ideation and development to deployment and support. To address all phases of a software development lifecycle, the CDP 102 includes a CDP development and publication component 116, a CDP order component 118, a CDP provisioning component 120, a CDP management component 122, and a CDP support component 124. The CDP development and publication component 116, the CDP order component 118, the CDP provisioning component 120, the CDP management component 122, and the CDP support component 124 can each be Platform as a Service ("PaaS") offerings implemented via software and executed by a hardware architecture 126 of the CDP 102. The hardware architecture 126 can include physical hardware components, including, but not limited to, one or more processing units (e.g., central processing units and/or graphical processing units), one or more memory modules, one or more storage components, one or more networking components, and/or other hardware components that are utilized by the CDP 102 to execute the CDP components 116-124 to perform various operations disclosed herein.

The CDP development and publication component 116 can allow developers to develop, test, and certify applications for cloud deployment. The CDP development and publication component 116 can provide integrated development and can offer reference architectures, best practices, and design principles for delivering service-oriented architectures via a cloud delivery model. The CDP development and publication component 116 can create CDOs, an example of which is illustrated and described with reference to FIG. 2. Additional details regarding the execution of the CDP development and publication component 116 are illustrated and described with reference to FIG. 4.

The CDP order component 118 can manage an order process workflow for applications and components thereof for initial deployment, re-deployment, and in response to events, such as, for example, maintenance, upgrade, recovery, and elastic capacity events, as will be described in greater detail herein. The CDP order component 118 can receive order requests from one or more portals and/or other applications via one or more application programming interfaces ("API") exposed by the CDP 102. The CDP order component 118 can identify and order resources, such as one or more of the compute resources 110, storage resources 112, and/or other resources 114, from the cloud orchestrator 108. Additional details regarding the execution of the CDP order component 118 are illustrated and described with reference to FIG. 6.

The CDP provisioning component 120 can receive an order from the CDP order component 118 and can perform distribution operations, delivery operations, installation operations, and configuration operations to provision a software application in accordance with a manifest. The manifest can include a master description of a CDO used for delivery and management. An example manifest is described with reference to FIG. 5. The CDP provisioning component 120 can execute initial deployment operations, elastic re-deployment operations, recovery deployment operations, and relocation deployment operations. The CDP provisioning component 120 can consider resources provided by multiple cloud orchestrators 108 based on one or more policies. Additional details regarding the execution of the CDP provisioning component 120 are illustrated and described with reference to FIG. 7.

The CDP management component 122 can monitor a level of service of a deployed CDO to maintain the deployed CDO at a specific level of service. The CDP management component 122 provides automated and intelligent detection and decision making to maintain the specific level of service. The level of service, monitoring points, and other metrics are described within the manifest of the deployed CDO. The CDP management component 122 can detect capacity and performance events and receive and respond to maintenance events, such as, for example, patches, upgrades, software releases, and relocation requests. After an event is detected, the CDP management component 122 can determine an appropriate course of action based upon the manifest and submit the appropriate order to implement the appropriate course of action to the CDP order component 118. Additional details regarding the execution of the CDP management component 122 are illustrated and described with reference to FIG. 8.

The CDP support component 124 can provide event monitoring via an API and/or an activity stream. The CDP support component 124 can broadcast events of all or a portion of the applications and services being provided by the CDP 102. A tool or software application can "tune" to a broadcast provided by the CDP support component 124 so that the tool or software application can receive and understand CDP events. The events can include events related to publish services, location services, order services, provision services, and management services, as will be described in greater detail below. Additional details regarding the execution of the CDP support component 124 are illustrated and described with reference to FIG. 9.

The illustrated CDP 102 also includes cloud deployment instances ("CDIs") 128A-128N and virtual resources 130A-130N. The cloud deployment instances 128A-128N are instances of CDOs deployed via the CDP 102. Each of the cloud service instances 128A-128N can be executed by a corresponding one or more of the virtual resources 130A-130N, which may be virtualization of one or more of the computer resources 110, the storage resources 112, and/or the other resources 114.

Figure 2:
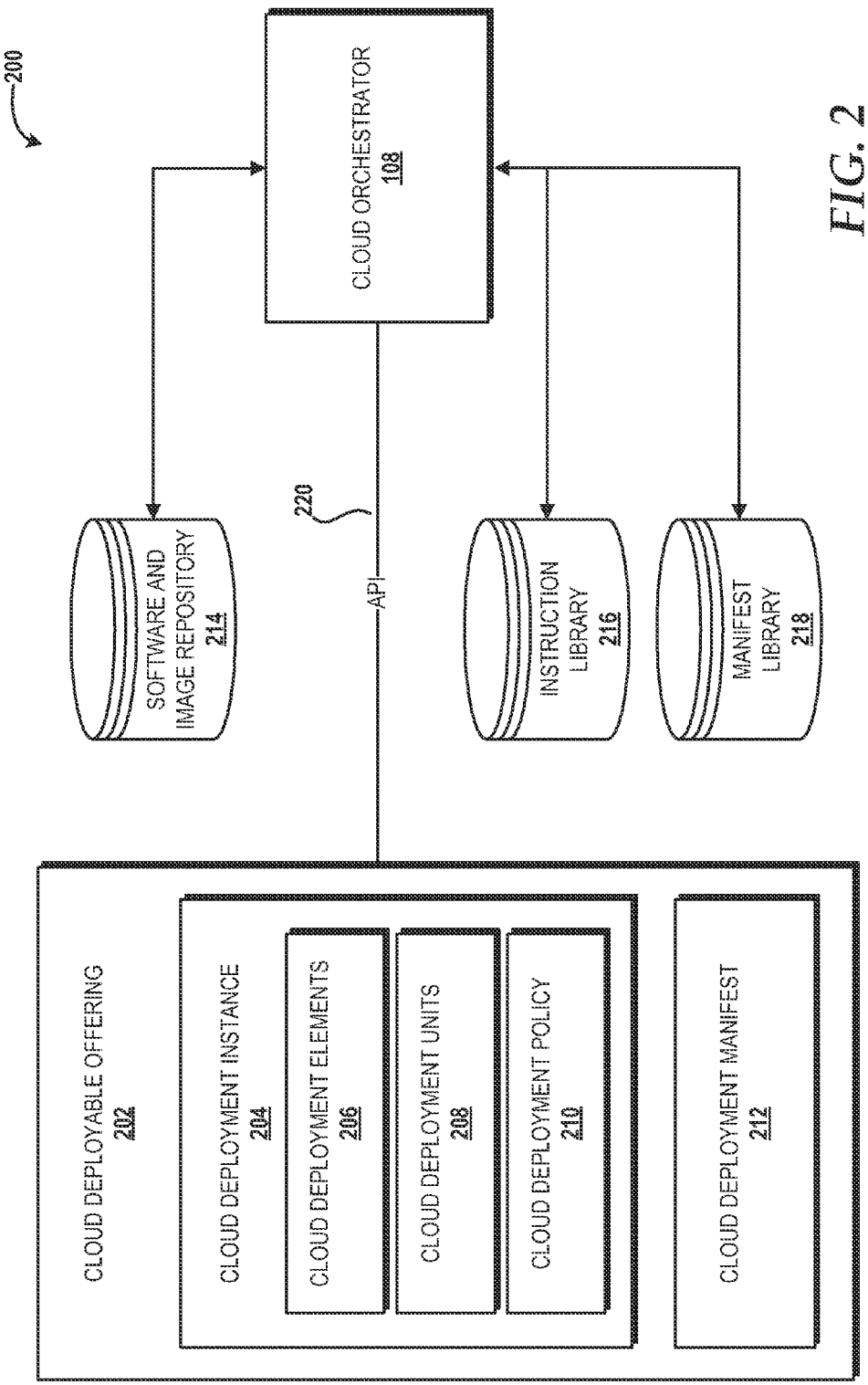
FIG. 2 is a block diagram illustrating additional aspects of an illustrative operating environment for implementing the various concepts and technologies disclosed herein.

Turning now to FIG. 2, another operating environment 200 will be described, according to an illustrative embodiment. The operating environment 200 includes an example cloud deployable offering ("CDO") 202. The CDO 202 can be any application or service that a developer desires to deploy within a cloud computing environment. The CDO 202 can be a combination of software, resources (e.g., one or more of the compute resources 110, the storage resources 112, and/or the other resources 114), and policies to be deployed and managed by the CDP 102.

The illustrated CDO 202 includes a CDI 204. The CDI 204 is the fundamental building block run-time representation of the CDO 202. The CDI 204 can include one or more cloud deployment elements ("CDEs") 206, one or more cloud deployment units ("CDUs") 208, and one or more cloud deployment policies ("CDPs") 210. The CDE(s) 206 can include software packages, programs, scripts, utilities, images, or some combination thereof that enable software delivery and management for the CDO 202. The CDU(s) 208 can include measurements units of resources, including, for example, the compute resources 110, the storage resources 112, and/or the other resources 114, to support the CDE(s) 206. The CDP(s) 210 can include instructions to build, deliver, and manage the CDE(s) 206 to a specific service level.

The illustrated CDO 202 is described via a cloud deployment manifest 212. The cloud deployment manifest 212 is the master description of all aspects of the CDO 202 used for delivery and management of the CDO 202 by the CDP 102. An illustrative example of the cloud deployment manifest 212 is illustrated and described with reference to FIG. 5.

The CDE(s) 206 identified in the CDO 202 can be stored in and obtained from a software and image repository 214. The software and image repository 214 can be implemented utilizing any storage technology or combination of storage technologies, including, for example, hard drives, solid-state drives, optical storage, tape storage, and/or the like. The software and image repository 214 may be part of the CDP 102 or external to and in communication with the CDP 102.

The CDP(s) 210 identified in the CDO 202 can be implemented utilizing one or more instructions obtained from an instruction library 216. The instruction library 216 can be implemented utilizing any storage technology or combination of storage technologies, including, for example, hard drives, solid-state drives, optical storage, tape storage, and/or the like. The instruction library 216 may be part of the CDP 102 or external to and in communication with the CDP 102. The instruction library 216 can be updated to include additional instructions, to modify existing instructions, and/or to remove instructions to accommodate different CDOs.

The cloud deployment manifest 212 can be stored in a manifest library 218. The manifest library 218 can be implemented utilizing any storage technology or combination of storage technologies, including, for example, hard drives, solid-state drives, optical storage, tape storage, and/or the like. The manifest library 218 may be part of the CDP 102 or external to and in communication with the CDP 102.

The manifest library 218 can be updated to include additional manifests, to modify existing manifests, and/or to remove manifests.

The illustrated operating environment 200 also includes an API 220. The CDP 102 (best shown in FIG. 1) can coordinate with the cloud orchestrator 108 via the API 220 to deploy the CDO 202.

Figure 3:
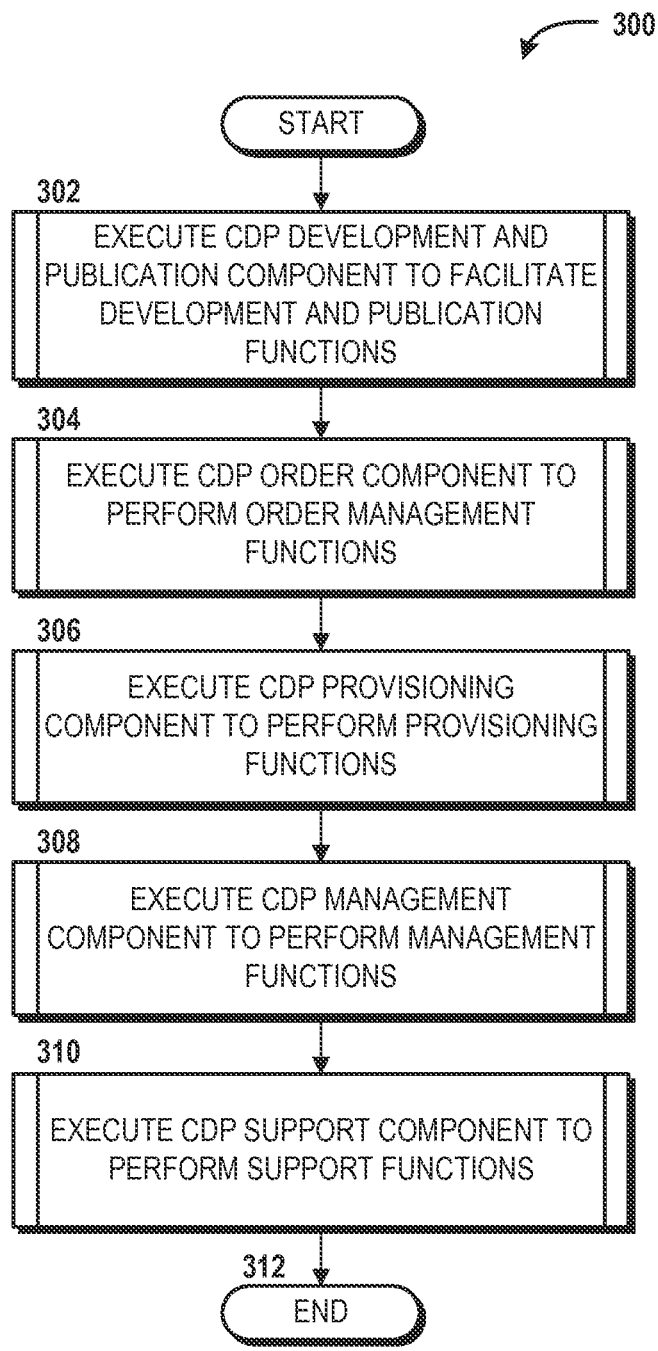
FIG. 3 is a flow diagram illustrating aspects of a method for providing a cloud delivery platform ("CDP"), according to an illustrative embodiment.

Turning now to FIG. 3, aspects of a method 300 for providing the CDP 102 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the hardware architecture 126 of the CDP 102, a processor of the cloud orchestrator 108, a processor of the compute resources 110, and/or a processor one or more other computing systems and/or devices disclosed herein to perform operations.

For purposes of illustrating and describing some of the concepts of the present disclosure, the methods disclosed herein are described as being performed, at least in part, by the CDP 102 described herein above with reference to FIG. 1, via execution of one or more software modules, which may be embodied, at least in part, by the various components 116-124 described above with reference to FIG. 1. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 1. The method 300 begins at operation 302, where the CDP 102 executes the CDP development and publication component 116 to facilitate a developer to perform development and publication functions for an application or service to be deployed via the CDP 102 as a CDO. A developer, via the CDP development and publication component 116 can develop, test, and certify an application/service or elements (features) thereof in a sandbox development environment and, when ready, clear the application/service or elements (features) thereof for deployment. The notion of elements is provided via the CDP development and publication component 116 by enabling decomposition of applications into specific elements that can be individually tested, certified, and deployed as CDOs (instead of merely deploying an entire application.) The CDP development and publication component 116 is described in greater detail below with reference to FIG. 4.

From operation 302, the method 300 proceeds to operation 304, where the CDP 102 executes the CDP order component 118 to perform order management functions. In particular, the CDP 102 can execute the CDP order component 118 to manage order process workflows for CDOs. In particular, the CDP order component 118 can be executed by the CDP 102 to manage initial deployment of CDOs and to manage maintenance, upgrade, recovery, and elastic capacity events. The CDP order component 118 can be executed by the CDP 102 to receive order requests from portals and/or other applications via one or more APIs exposed by the CDP 102. The CDP order component 118 can also identify and order resources, such as, for example, the compute resources 110, the storage resources 112, and/or the other resources 114, from the cloud orchestrator 108. The CDP order component 118 is described in greater detail below with reference to FIG. 6.

From operation 304, the method 300 proceeds to operation 306, where the CDP 102 executes the CDP provisioning component 120 to perform provisioning functions. In particular, the CDP 102 can execute the CDP provisioning component 120 to perform distribution, delivery, installation, and configuration functions of all elements of a CDO in accordance with the CDO's manifest. The CDP provisioning component 120 can be executed by the CDP 102 to perform initial deployment, elastic re-deployment, recovery deployment, and relocation deployment of CDOs. The CDP provisioning component 118 is described in greater detail below with reference to FIG. 7.

From operation 306, the method 300 proceeds to operation 308, where the CDP 102 executes the CDP management component 122 to perform management functions. In particular, the CDP 102 can execute the CDP management component 122 to monitor CDOs to maintain the CDOs at a specific level of service described in corresponding manifests. The CDP management component 122 can be executed by the CDP 102 to provide automated and intelligent detection and decision making to maintain the specific level of service. The CDP management component 122 can be executed by the CDP 102 to detect capacity and performance events and to receive and respond to maintenance events, such as, for example, patches, upgrades, software releases, and relocation requests. After an event trigger is detected, the CDP management component 122 is executed by the CDP 102 to determine an appropriate course of action based upon the manifest and submit the appropriate order to implement the appropriate course of action to the CDP order component 118. Additional details regarding the execution of the CDP management component 122 are illustrated and described with reference to FIG. 8.

From operation 308, the method 300 proceeds to operation 310, where the CDP 102 executes the CDP support component 124 to perform support functions. In particular, the CDP 102 can execute the CDP support component 124 to provide event monitoring via an API and/or an activity stream. The CDP support component 124 can be executed by the CDP 102 to broadcast events of all or a portion of the applications and services being provided by the CDP 102. A tool or software application can "tune" to a broadcast provided by the CDP support component 124 so that the tool or software application can receive and understand CDP events. The events can include events related to publish services, location services, order services, provision services, and management services, as will be described in greater detail below. Additional details regarding the execution of the CDP support component 124 are illustrated and described with reference to FIG. 9.

From operation 310, the method 300 proceeds to operation 312. The method 300 ends at operation 312.

Figure 4:
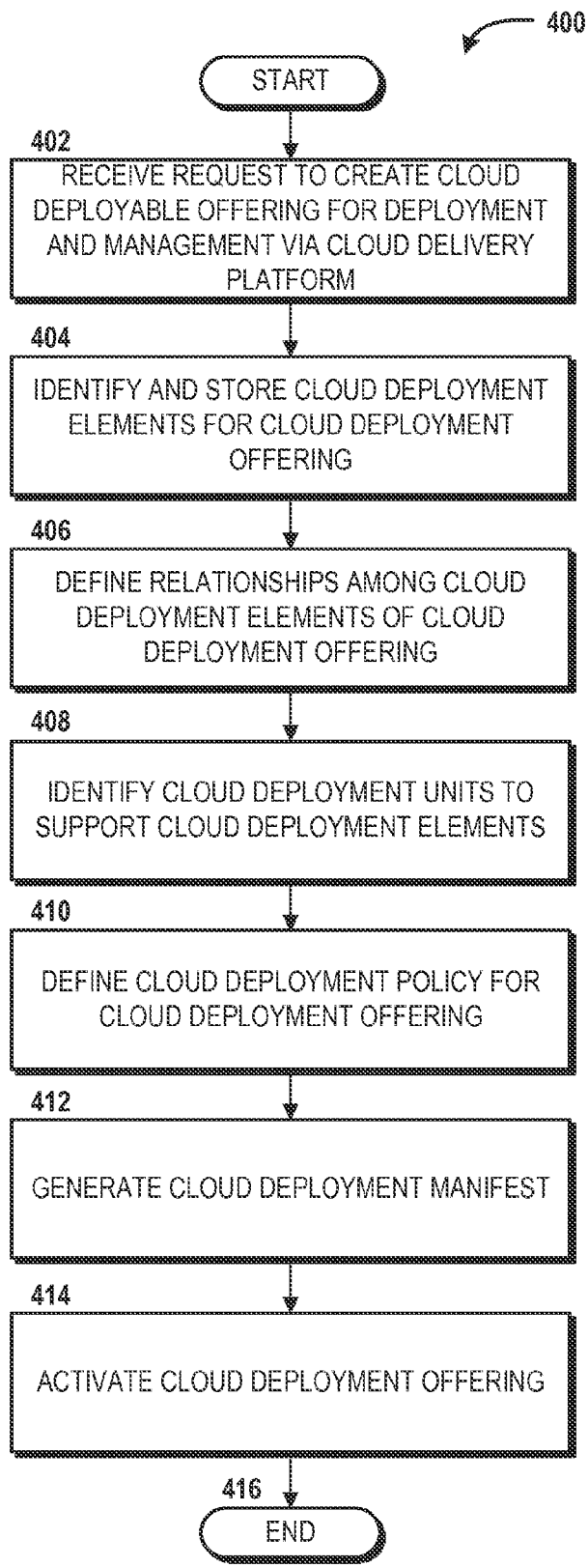
FIG. 4 is a flow diagram illustrating aspects of a method for executing a development and publication component of the CDP, according to an illustrative embodiment.

Turning now to FIG. 4, a method 400 for executing the CDP development and publication component 116 will be described in detail, according to an illustrative embodiment. The method 400 will be described from the perspective of the CDP 102 executing the CDP development and publication component 116 to perform various operations. Moreover, the method 400 will be described with reference to FIG. 4 and further reference to FIGS. 1 and 2.

The method 400 begins and proceeds to operation 402, where the CDP 102 receives a request to create a CDO, such as the CDO 202, for deployment and management via the CDP 102. From operation 402, the method 400 proceeds to operation 404, where the CDP 102 identifies one or more CDEs, such as the CDEs 206 illustrated in FIG. 2, and stores the CDEs 206 in the software and image repository 214. Alternatively, the CDP 102 can identify the CDEs 206 so that the CDEs 206 can be retrieved from the software and image repository 214.

From operation 404, the method 400 proceeds to operation 406, where the CDP 102 defines one or more relationships among the CDEs 206 of the CDO 202. The relationships describe how the CDEs 206 interact with one another to carry out various functions of the CDO 202. From operation 406, the method 400 proceeds to operation 408, where the CDP 102 identifies one or more CDUs, such as the CDUs 208 illustrated in FIG. 2, to support deployment of the CDEs 206 and the relationships among the CDEs 206 identified and defined above during operations 404 and 406, respectively.

From operation 408, the method 400 proceeds to operation 410, where the CDP 102 defines one or more CDPs, such as the CDP 210 illustrated in FIG. 2, to build, deliver, and manage the CDO 202 to maintain the CDO 202 at a specific level of service. From operation 410, the method 400 proceeds to operation 412, where the CDP 102 generates a cloud deployment manifest, such as the cloud deployment manifest 212 illustrated in FIG. 2. The cloud deployment manifest 212 can include the CDEs 206 identified at operation 404, the relationships defined at operation 406, the CDUs 208 identified at operation 408, and the CDP 210 defined at operation 410.

From operation 412, the method 400 proceeds to operation 414, where the CDP 102 activates the CDO 202 so that one or more instances of the CDO 202 (i.e., one or more CDIs 204) can be ordered and deployed in accordance with the specifications set forth in the cloud deployment manifest 212. From operation 414, the method 400 proceeds to operation 416, where the method 400 ends.

Turning now to FIG. 5, a block diagram illustrating an illustrative example cloud deployment manifest 500 will be described. The example cloud deployment manifest 500 is an illustrative example of the cloud deployment manifest 212 described above with reference to FIG. 2. The cloud deployment manifest 212, as described above, can include a master description of all aspects of a CDO, such as the CDO 202, and can be used for delivery and management of the CDO 202 by the CDP 102.

The illustrated example cloud deployment manifest 500 includes a CDE field 502, a role field 504, a quantity field 506, and a packages field 508. The CDE field 502 identifies each CDE type to be deployed. In the illustrated example, the CDE field 502 includes a number to identify each CDE, although other identifiers are contemplated.

The role field 504 identifies a role for each CDE in the example cloud deployment manifest 500. In the illustrated example, the role field 504 includes ADMIN, STAGE, MASTER-1, MASTER-2, MASTER-3, and DATA NODE, each corresponding to one of the CDEs identified in the CDE field 502 and identifying a role for that CDE. The roles can be pre-defined for any particular implementation of the CDP 102, and as such, the illustrated roles should not be construed as being limiting in any way.

The quantity field 506 identifies a quantity of each CDE in the example cloud deployment manifest 500. In the illustrated example, the quantity field 506 includes a number of each CDE type to be deployed. The quantity field 506 can include any number of each CDE type, and as such, the examples shown should not be construed as being limiting in any way.

The packages field 508 identifies one or more software packages to be utilized by each CDE identified in the CDE field 502. As shown in the illustrated example, each CDE type may have relationships with multiple software packages, and some CDE types may utilize the same software packages. The software packages referenced in the packages field 508 can be obtained from the software and image repository 214 described above with reference to FIG. 2.

The illustrated example cloud deployment manifest 500 also includes a provisioning types enabled field 510, a process field 512, and an image location field 514. The provisioning types enabled field 510 identifies the type of provisioning that is enabled for the associated CDO. The process field 512 identifies the process to be used for the corresponding provisioning type. The image location field 514 identifies a location of an image file to be used for the corresponding provisioning type and process.

In the illustrated example, the provisioning types enabled field 510 includes initial provisioning, elastic event provisioning, and recovery provisioning. Initial provisioning is a type of provisioning for the initial deployment of the CDO. Elastic event provisioning is a type of provisioning that allows a CDO to be scaled up or down based upon demand. Recovery provisioning is a type of provisioning that allows a CDO to return to a previous state to recover from a failure or other issue with the CDO.

In the illustrated example, the process field 512 identifies a stick deploy process. Stick deploy refers to the process of installing, configuring, testing, and running a software service using scripts, programs, and software media to create a running element. The opposite of stick build is an image. An image was "stick built" on a staging server and then a snapshot image was taken of the resulting installation. In some software scenarios, it may be necessary to "stick build" software elements, whereas other scenarios may allow for a "snapshot" of an existing installation to be taken and used as-is. Stick build automates the steps humans would typically do in planning, copying software to a machine, running manual commands, updating configuration files manually, starting processes, and running verification and testing scripts. The term "image" is used herein to refer to a binary snapshot of a running environment and the media (i.e., the software archive used for installation purposes) for the initial provisioning type and a snapshot restore process for the elastic event and recovery provisioning types. The snapshot restore process can restore a deployment of a CDO to a previous state. In some embodiments, an instance of a CDO can be saved periodically as a snapshot state that can be utilized by the snapshot restore process to return an instance of a CDO to a previous state to recover from a failure or other issue.

The image location field 514, in the illustrated example, identifies the image location to be used for each of the provisioning types and processes identified in the provisioning types enabled field 510 and the process field 512. For the snapshot restore process, the image location field 514 can identify a location of a snapshot image that is to be used to restore an instance of a CDO to a previous state prior to a failure or other issue with the CDO.

The illustrated example cloud deployment manifest 500 also includes a CDU field 516, a CPU/CORE field 518, a memory field 520, and a storage field 522. The CDU field 516 identifies each CDU type to be deployed. In the illustrated example, the CDU field 516 includes a number and a brief description to identify each CDU type, although other identifiers are contemplated. Each CDU type can include different resource specifications, which are defined in the CPU/CORE field 518, the memory field 520, and the storage field 522.

Figure 6:
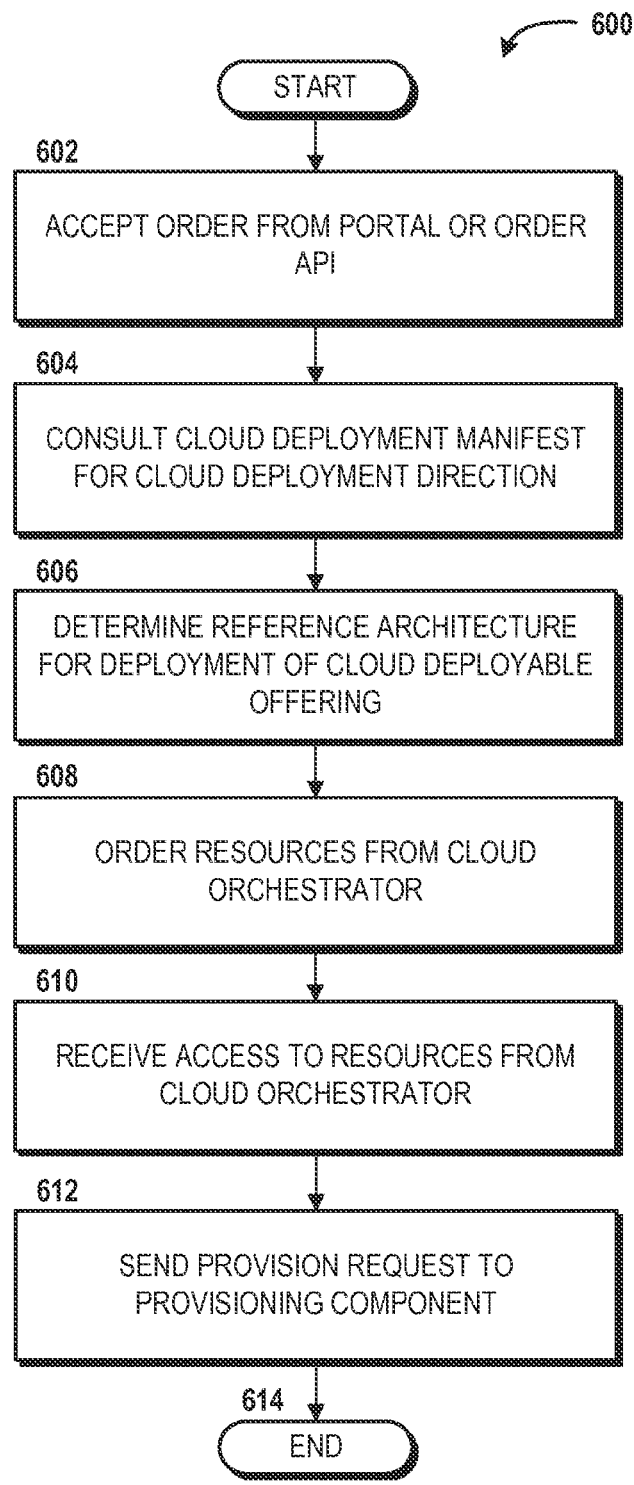
FIG. 6 is a flow diagram illustrating aspects of a method for executing an order component of the CDP, according to an illustrative embodiment.

Turning now to FIG. 6, a method 600 for executing the CDP order component 118 will be described in detail, according to an illustrative embodiment. The method 600 will be described from the perspective of the CDP 102 executing the CDP order component 118 to perform various operations. Moreover, the method 600 will be described with reference to FIG. 6 and further reference to FIGS. 1 and 2.

The method 600 begins and proceeds to operation 602, where the CDP 102 accepts an order to deploy one or more instances of a CDO, such as the CDO 202. In some embodiments, the CDP 102 can receive an order via one or more web portals. In some embodiments, the CDP 102 can receive an order via an order API. In either embodiment, the method 600 proceeds from operation 602 to operation 604. At operation 604, the CDP 102 consults a cloud deployment manifest, such as the cloud deployment manifest 212, to determine a direction for cloud deployment of the CDO 202. In particular, the CDP 102 determines the CDE(s) 206, the CDU(s) 208, and the CDP(s) 210 defined in the cloud deployment manifest 212 for cloud deployment of the CDO 202.

From operation 604, the method 600 proceeds to operation 606, where the CDP 102 determines a reference architecture, if any, to utilize for deployment of the CDO 202. The reference architecture may include the same or similar CDU(s) 208 as identified in the cloud deployment manifest 212 that are useable to support the CDE(s) 206 identified in the cloud deployment manifest 212. The reference architecture, in some embodiments, is provided as a baseline architecture that can be upgraded or downgraded to meet the needs of the cloud deployment manifest 212.

From operation 606, the method 600 proceeds to operation 608, where the CDP 102 orders resources associated with the CDU(s) 208 from one of the qualifying cloud orchestrators 108 via the API 220. The cloud orchestrator 108, in response, can deploy at least a portion of the compute resources 110, the storage resources 112, and/or the other resources 114 that are associated with the CDU(s) 208 identified in the cloud deployment manifest 212.

From operation 608, the method 600 proceeds to operation 610, where the CDP 102 receives access to the resources ordered from the selected cloud orchestrator 108. In other words, the cloud orchestrator 108 releases the ordered resources so that the CDO 202 can be deployed thereon. From operation 610, the method 600 proceeds to operation 612, where the CDP 102 sends a provision request to the CDP provisioning component 120.

From operation 612, the method 600 proceeds to operation 614. The method 600 ends at operation 614.

Figure 7:
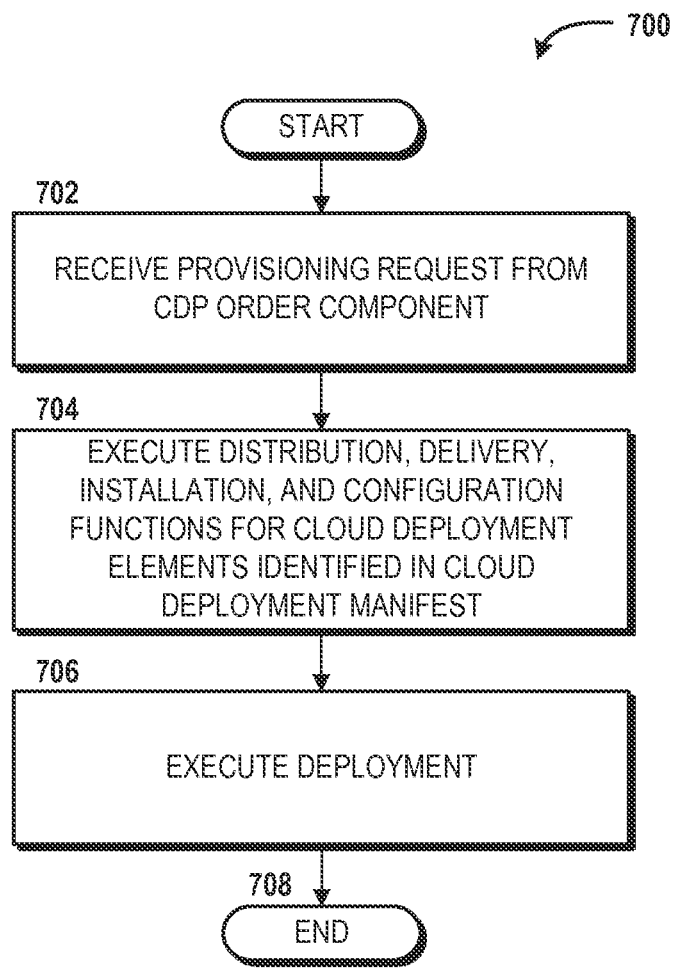
FIG. 7 is a flow diagram illustrating aspects of a method for executing a provisioning component of the CDP, according to an illustrative embodiment.

Turning now to FIG. 7, a method 700 for executing the CDP provisioning component 120 will be described in detail, according to an illustrative embodiment. The method 700 will be described from the perspective of the CDP 102 executing the CDP provisioning component 120 to perform various operations. Moreover, the method 700 will be described with reference to FIG. 7 and further reference to FIGS. 1 and 2.

The method 700 begins and proceeds to operation 702, where the CDP 102 receives a provisioning request from the CDP order component 118. From operation 702, the method 700 proceeds to operation 704, where the CDP 102 executes distribution, delivery, installation, and configuration functions to prepare the CDE(s) 206 for deployment on the CDU(s) 208. The operation 704 can include distributing each of the CDE(s) 206 to the CDU(s) 208, installing the CDE(s) 206 on the CDU(s) 208, and configuring the CDE(s) 206 on the CDU(s) 208 in preparation for deployment of the CDO 202.

From operation 704, the method 700 proceeds to operation 706, where the CDP 102 executes a deployment. The first deployment executed by the CDP 102 is an initial deployment of one or more instances of the CDO 202. After the initial deployment, the deployment executed at operation 706 may be a re-deployment (using the initial deployment parameters) of one or more instances of the CDO 202. After the initial deployment, the deployment executed at operation 706 alternatively may be a recovery deployment to return one or more instances of the CDO 202 to a previous state that was saved in accordance with the snapshot process described herein above. After the initial deployment, the deployment executed at operation 706 alternatively may be a relocation deployment to relocate one or more instances of the CDO 202 from the resources utilized in the initial deployment to resources that are at least partially different from the resources utilized in the initial deployment. After the initial deployment, the deployment executed at operation 706 alternatively may be an elastic deployment triggered in response to an elastic event such as load or demand changes, the detection of offline servers, and/or other events that change the ability of a deployment of the CDO 202 to perform within certain specifications.

From operation 706, the method 700 proceeds to operation 708. The method 700 ends at operation 708.

Figure 8:
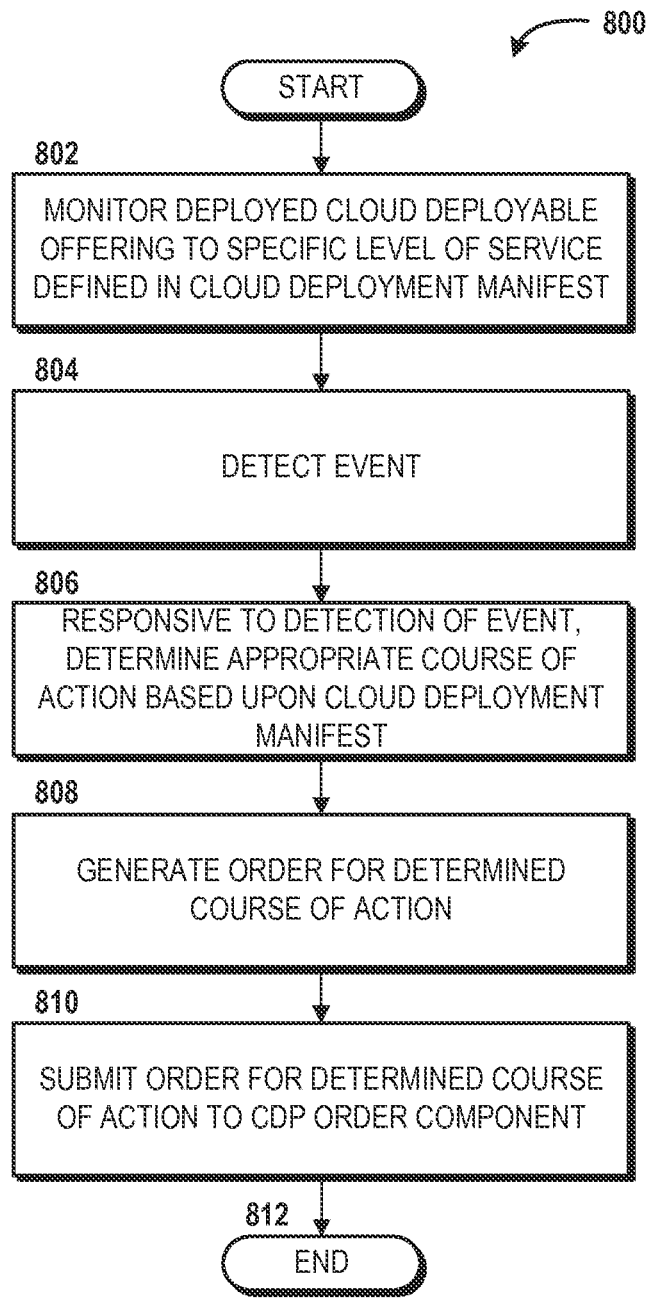
FIG. 8 is a flow diagram illustrating aspects of a method for executing a management component of the CDP, according to an illustrative embodiment.

Turning now to FIG. 8, a method 800 for executing the CDP management component 122 will be described in detail, according to an illustrative embodiment. The method 800 will be described from the perspective of the CDP 102 executing the CDP management component 122 to perform various operations. Moreover, the method 800 will be described with reference to FIG. 8 and further reference to FIGS. 1 and 2.

The method 800 begins and proceeds to operation 802, where the CDP 102 monitors a deployed CDO, such as the CDO 202 after deployment during the method 700. The CDP 102 monitors the CDO 202 to maintain the CDO 202 at a specific level of service defined in the cloud deployment manifest 212. From operation 802, the method 800 proceeds to operation 804, where the CDP 102 detects an event. The event can relate to capacity and/or performance of one or more instances of the CDO 202 on the CDUs 208 defined in the cloud deployment manifest 212. In other words, the CDP 102 can detect the event responsive to a condition related to capacity, performance, and/or other aspect of one or more instances of the CDO 202 that results in the CDO 202 being different from the specific level of service defined in the cloud deployment manifest 212.

From operation 804, the method 800 proceeds to operation 806, where the CDP 102, in response to detecting the event at operation 804, determines an appropriate course of action, based upon the cloud deployment manifest 212, to return the CDO 202 to the specific level of service defined in the cloud deployment manifest 212. The course of action may include, for example, performing a re-deployment, relocation deployment, or elastic deployment, or otherwise providing an order to the CDP order component 118 to order the resources necessary to return the CDO 202 to the specific level of service defined in the cloud deployment manifest 212.

From operation 806, the method 800 proceeds to operation 808, where the CDP 108 generates an order for the course of action determined at operation 806. From operation 808, the method 800 proceeds to operation 810, where the CDP 108 submits the order to the CDP order component 118. The CDP order component 118 can receive the order and process the order in accordance with the method 600 illustrated and described with reference to FIG. 6. From operation 810, the method 800 proceeds to operation 812, where the method 800 ends.

Figure 9:
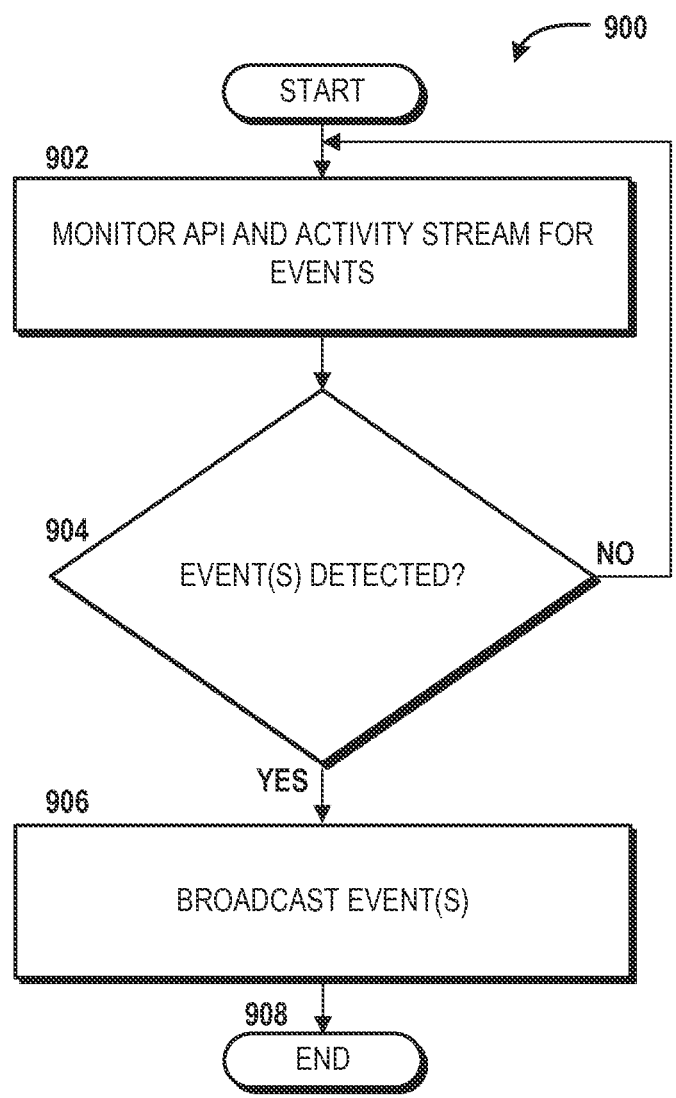
FIG. 9 is a flow diagram illustrating aspects of a method for executing a support component of the CDP, according to an illustrative embodiment.

Turning now to FIG. 9, a method 900 for executing the CDP support component 124 will be described in detail, according to an illustrative embodiment. The method 900 will be described from the perspective of the CDP 102 executing the CDP support component 124 to perform various operations. Moreover, the method 900 will be described with reference to FIG. 9 and further reference to FIGS. 1 and 2.

The method 900 begins and proceeds to operation 902, where the CDP 102 monitors one or more APIs and/or one or more activity streams associated with operations performed by the CDP 102 to determine whether or not an event has occurred. An event can include a publish services event, a location services event, an order services event, a provision services event, a management services event, or any other event that involves the CDP 102 or at least a portion thereof. Publish services events can include all additions, changes, activations, or other events that involve the CDP development and publication component 116. Location services events can include initial deployment events and relocation deployment events. Order services events can include events that involve the CDP order component 118. Provision services events can include any provisioning events, including initial, elastic, recovery, and relocation provisioning events, and other events that involve the CDP provisioning component 120. Management services events can include any management events that involve the CDP management component 122.

From operation 902, the method 900 proceeds to operation 904, where the CDP 102 determines whether an event has occurred. If so, the method 900 proceeds from operation 904 to operation 906, where the CDP 102 broadcasts the event(s). If, however, the CDP 102 determines that no event has occurred, the method 900 returns to operation 902, where the CDP 102 continues to monitor one or more APIs and/or one or more activity streams associated with operations performed by the CDP 102 to determine whether or not an event has occurred.

From operation 906, the method 900 proceeds to operation 908. The method 900 ends at operation 908.

Figure 10:
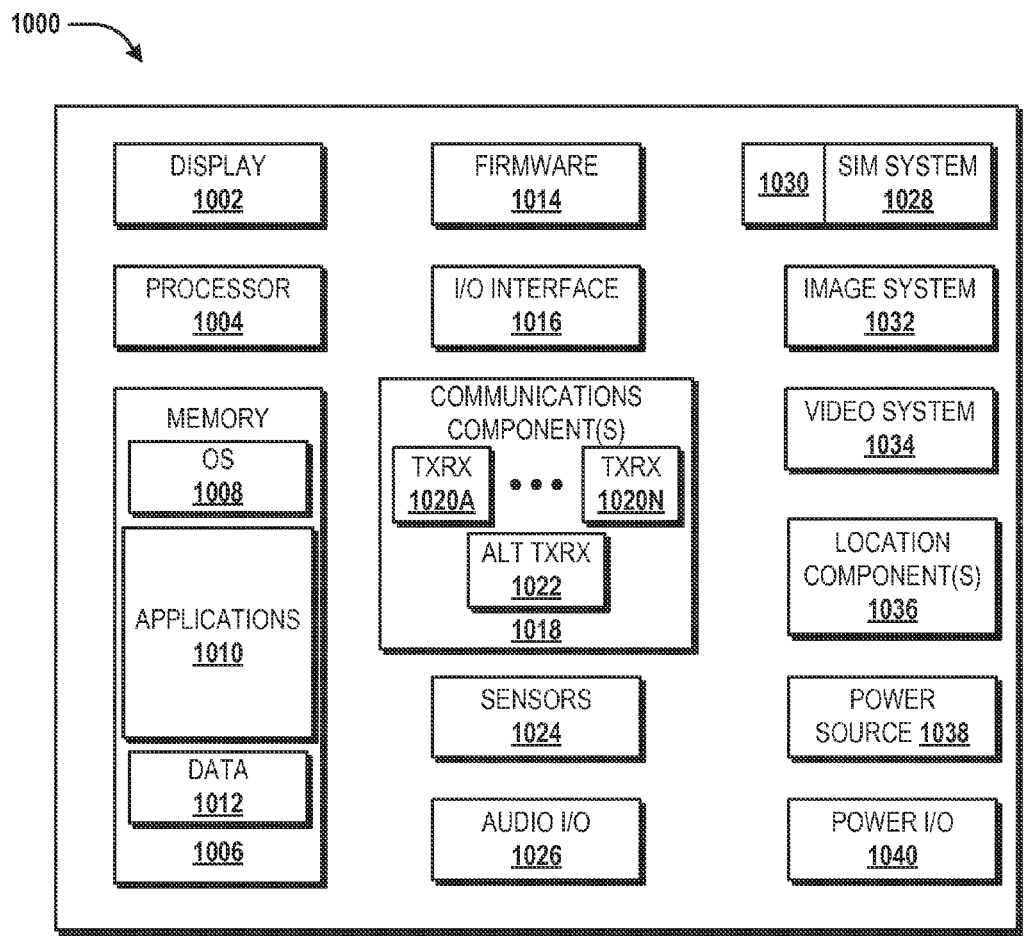
FIG. 10 is a block diagram illustrating an example mobile device capable of implementing aspects of the embodiments disclosed herein.

Turning now to FIG. 10, an illustrative mobile device 1000 and components thereof will be described. While connections are not shown between the various components illustrated in FIG. 10, it should be understood that some, none, or all of the components illustrated in FIG. 10 can be configured to interact with another to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010, such as a near-field communications ("NFC") application, other computer-executable instructions stored in a memory 1006, or the like. In some embodiments, the applications 1010 also can include a UI application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering content, viewing account information, answering/initiating calls, entering/deleting data, entering and setting user IDs and passwords for device access, configuring settings, manipulating address book content and/or settings, multimode interaction, interacting with other applications 1010, and otherwise facilitating user interaction with the operating system 1008, the applications 1010, and/or other types or instances of data 1012 that can be stored at the mobile device 1000. The data 1012 can include, for example, one or more identifiers, and/or other applications or program modules. According to various embodiments, the data 1012 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 1016. The I/O interface 1016 can be configured to support the input/output of data such as location information, user information, organization information, presence status information, user IDs, passwords, and application initiation (start-up) requests. In some embodiments, the I/O interface 1016 can include a hardwire connection such as USB port, a mini-USB port, a micro-USB port, an audio jack, a PS2 port, an IEEE 13104 ("FIREWIRE") port, a serial port, a parallel port, an Ethernet (RJ410) port, an RJ10 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments one or more of the transceivers of the communications component 1018 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 1018 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 1018 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an $N^{th}$ transceiver ("TxRx") 1020N that can operate in a second communications mode relative to the first transceiver 1020A (e.g., UMTS). While two transceivers 1020A-N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, IRDA, NFC, other RF technologies, combinations thereof, and the like.

In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, orientation sensors, noise sensors, proximity sensors, or the like. As such, it should be understood that the sensors 1024 can include, but are not limited to, accelerometers, magnetometers, gyroscopes, infrared sensors, noise sensors, microphones, combinations thereof, or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another mobile device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from GPS devices, A-GPS devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

Figure 11:
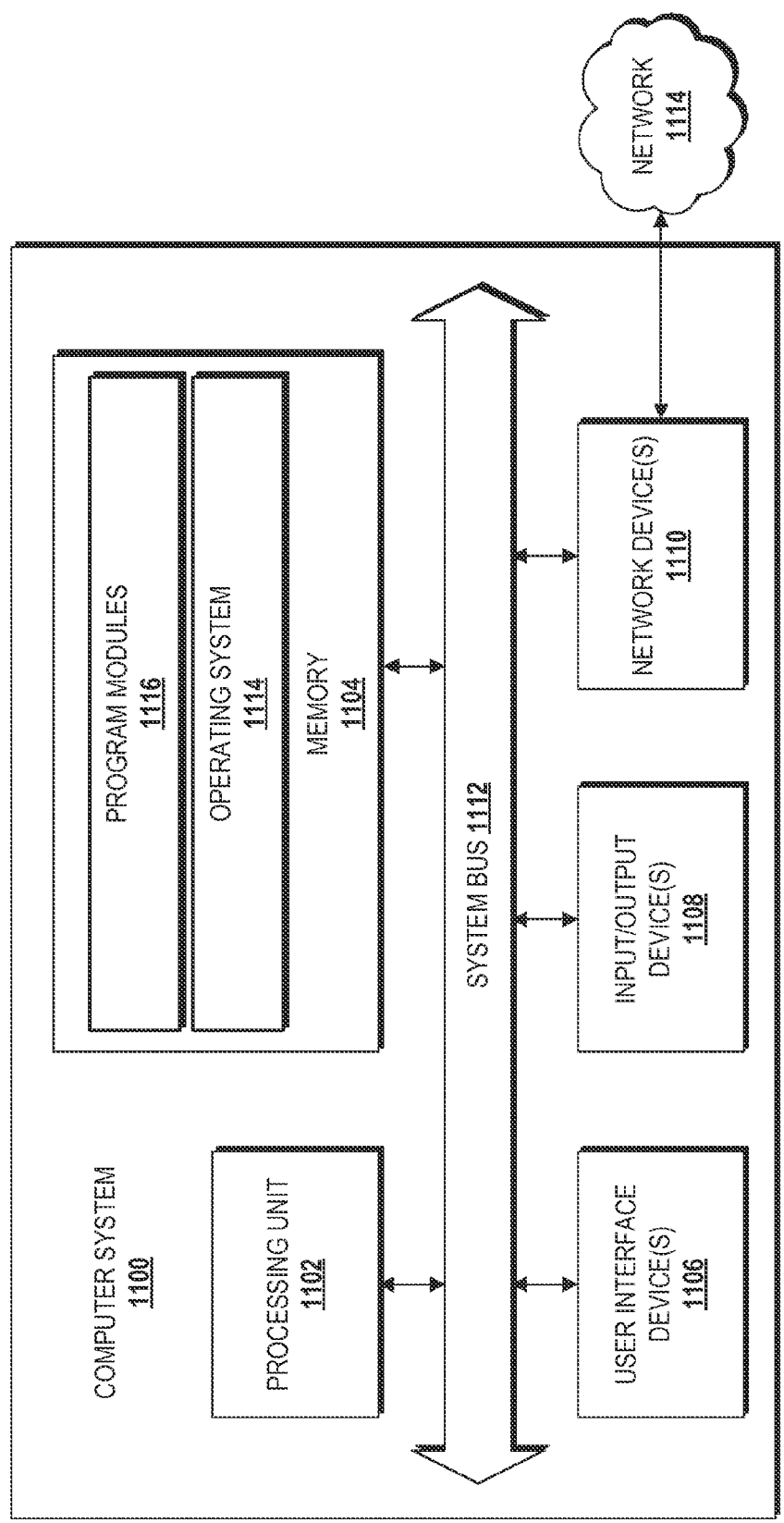
FIG. 11 is a block diagram illustrating an example computer system capable of implementing aspects of the embodiments presented herein.

FIG. 11 is a block diagram illustrating a computer system 1100 configured to provide the functionality in accordance with various embodiments of the concepts and technologies disclosed herein. In some implementations, the hardware architecture 126 (best illustrated in FIG. 1) is configured like the architecture of the computer system 1100. It should be understood, however, that modification to the architecture may be made to facilitate certain interactions among elements described herein. In some implementations, the compute resources 110, the storage resources 112, and/or the other resources 114 are configured like the architecture of the computer system 1100 or portions thereof.

The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 110 can include one or more processing units 1102.

The memory 1104 communicates with the processing unit 1102 via the system bus 1112. In some embodiments, the memory 1104 is operatively connected to a memory controller (not shown) that enables communication with the processing unit 1102 via the system bus 1112. The compute resources 110 can include one or more instances of the memory 1104. The illustrated memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1116 may include various software and/or program modules to perform the various operations described herein. For example, the program modules can include the CDP development and publication component 116, the CDP order component 118, the CDP provisioning component 120, the CDP management component 122, the CDP support component 124, or some combination thereof. The program modules 1116 and/or other programs can be embodied in computer-readable media containing instructions that, when executed by the processing unit 1102, perform various operations such as those described herein. According to embodiments, the program modules 1116 may be embodied in hardware, software, firmware, or any combination thereof. Although not shown in FIG. 11, it should be understood that the memory 1104 also can be configured to store the software and image repository 214, the instruction library 216, the manifest library 218, or some combination thereof.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium" and variations thereof does not include waves or signals per se and/or communication media.

The user interface devices 1106 may include one or more devices with which a user accesses the computer system 1100. The user interface devices 1106 may include, but are not limited to, computers, servers, PDAs, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer.

The network devices 1110 enable the computer system 1100 to communicate with other networks or remote systems via a network 1114. Examples of the network devices 1110 include, but are not limited to, a modem, a radio frequency ("RF") or infrared ("IR") transceiver, a telephonic interface, a bridge, a router, or a network card. The network 1114 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1114 may be a wired network such as, but not limited to, a Wide Area Network ("WAN"), a wired Personal Area Network ("PAN"), or a wired Metropolitan Area Network ("MAN"). The network 1114 may be any other network described herein.

Figure 12:
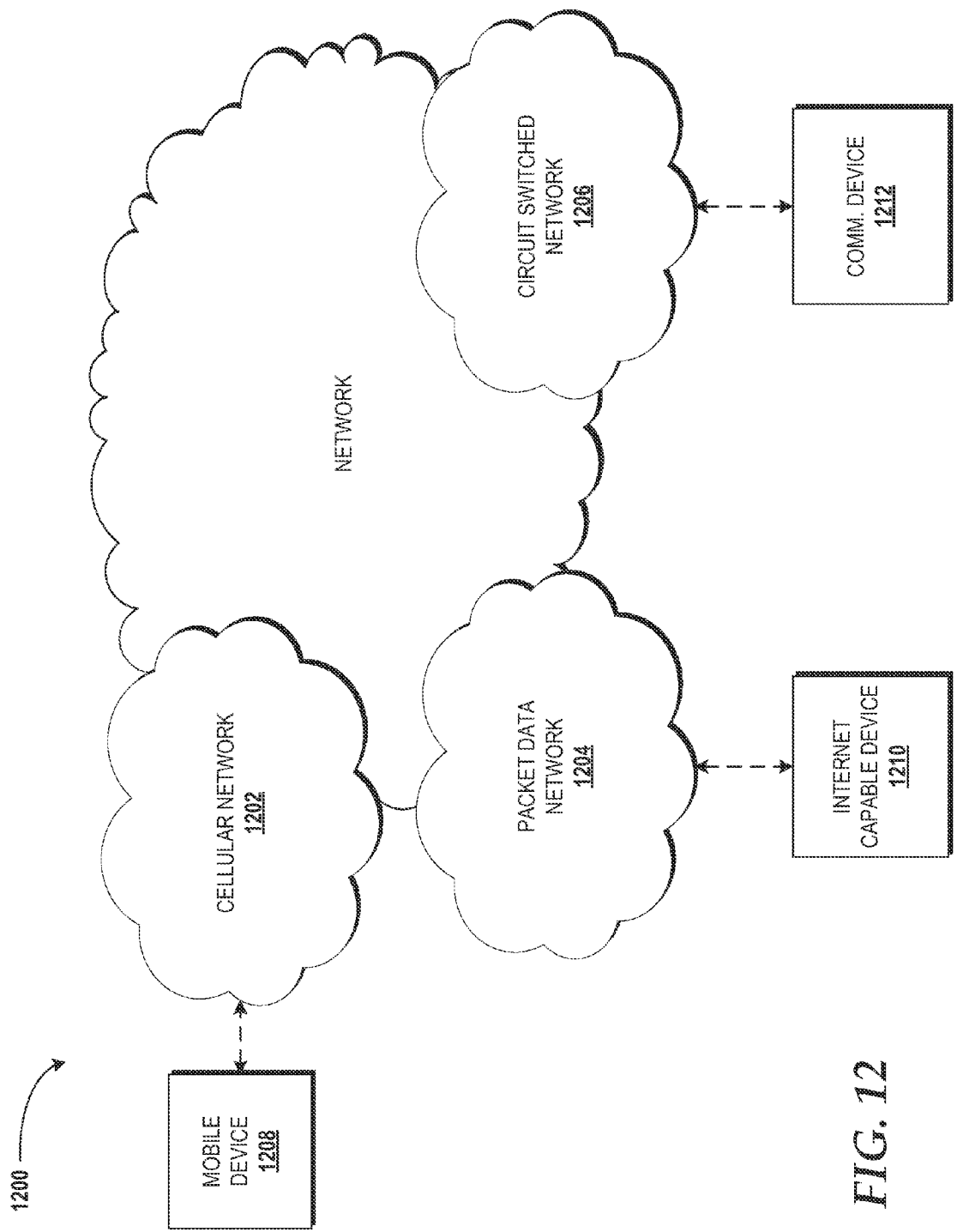
FIG. 12 is a diagram illustrating a network, according to an illustrative embodiment.

Turning now to FIG. 12, details of a network 1200 are illustrated, according to an illustrative embodiment. The network 1200 includes a cellular network 1202, a packet data network 1204, for example, the Internet, and a circuit switched network 1206, for example, a PSTN. The cellular network 1202 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206. The CDP 102, the cloud orchestrator 108, the software and image repository 214, the instruction library 216, the manifest library 218, the mobile device 1000, the computer system 1100, other devices and/or systems described herein, or combinations thereof can be in communication with or be included in the network 1200.

A mobile communications device 1208, such as, for example, a cellular telephone, a user equipment, a mobile terminal, a PDA, a laptop computer, a handheld computer, and combinations thereof, can be operatively connected to the cellular network 1202. The cellular network 1202 can be configured as a 2G GSM network and can provide data communications via GPRS and/or EDGE. Additionally, or alternatively, the cellular network 1202 can be configured as a 3G UMTS network and can provide data communications via the HSPA protocol family, for example, HSDPA, EUL (also referred to as HSUPA), and HSPA+. The cellular network 1202 also is compatible with 4G mobile communications standards such as LTE, or the like, as well as evolved and future mobile standards.

The packet data network 1204 includes various devices, for example, servers, computers, databases, and other devices in communication with one another, as is generally known. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet. The circuit switched network 1206 includes various hardware and software for providing circuit switched communications. The circuit switched network 1206 may include, or may be, what is often referred to as a POTS. The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210, for example, a PC, a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210. In the specification, the network 1200 is used to refer broadly to any combination of the networks 1202, 1204, 1206. It should be appreciated that substantially all of the functionality described with reference to the network 1200 can be performed by the cellular network 1202, the packet data network 1204, and/or the circuit switched network 1206, alone or in combination with other networks, network elements, and the like.

Based on the foregoing, it should be appreciated that concepts and technologies directed to a cloud delivery platform have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A cloud delivery platform comprising:
a hardware architecture comprising at least one processor and at least one memory module; and
a plurality of components that, when executed by the at least one processor of the hardware architecture, causes the at least one processor of the hardware architecture to perform operations comprising
identifying a cloud deployment element of a cloud deployable offering,
identifying a cloud deployment unit to support deployment of the cloud deployment element,
defining a cloud deployment policy to build, deliver, and manage the cloud deployable offering at a level of service,
generating a cloud deployment manifest comprising an identifier associated with the cloud deployment element, an identifier associated with the cloud deployment unit, and the cloud deployment policy, the cloud deployment manifest further comprising a type of the cloud deployment element, a role associated with the cloud deployment element, a quantity of the cloud deployment element to be deployed, a software package to be utilized by the cloud deployment element, and a plurality of types of provisioning enabled for the cloud deployable offering, wherein the plurality of types of provisioning comprise an initial provisioning for an initial deployment of the cloud deployable offering, an elastic event provisioning allowing the cloud deployable offering to be scaled up or scaled down based upon demand, and a recovery provisioning allowing the cloud deployable offering to return to a previous state to recover from a failure, wherein the cloud deployment manifest further comprises, for each of the plurality of types of provisioning enabled for the cloud deployable offering, a corresponding type of process to be used to perform each of the plurality of types of provisioning, and wherein the corresponding type of process used to perform the initial provisioning comprises a stick deploy process and the corresponding type of process used to perform the elastic event provisioning and the recovery provisioning comprises a snapshot restore process,
receiving an order to deploy an instance of the cloud deployable offering,
ordering, from a cloud orchestrator, a resource to be utilized by the cloud deployable offering, the resource associated with the cloud deployment unit identified in the cloud deployment manifest,
receiving access to the resource,
distributing the cloud deployment element to the resource associated with the cloud deployment unit, and
configuring the cloud deployment element on the cloud deployment unit in preparation for deployment of the cloud deployable offering.

2. The cloud delivery platform of claim 1, wherein the operations further comprise managing the cloud deployable offering to ensure that the cloud deployable offering meets the level of service set forth in the cloud deployment policy.

3. The cloud delivery platform of claim 2, wherein managing the cloud deployable offering to ensure that the cloud deployable offering meets the level of service comprises:
detecting an event; and
responding to the event by performing a function to return the cloud deployable offering to the level of service.

4. The cloud delivery platform of claim 3, wherein the function to return the cloud deployable offering to the level of service comprises generating an order directed to the cloud orchestrator to order additional resources to return the cloud deployable offering to the level of service.

5. The cloud delivery platform of claim 3, wherein the function to return the cloud deployable offering to the level of service comprises:
installing a patch to the cloud deployable offering;
upgrading the cloud deployable offering;
relocating the cloud deployable offering from resources including the resource to new resources and provisioning the cloud deployable offering on the new resources;
performing a recovery deployment to return the cloud deployable offering to a previous state in which the level of service is met; or
re-provisioning the cloud deployable offering on the resources.

6. The cloud delivery platform of claim 1, wherein the operations further comprise:
monitoring the plurality of components to determine whether an event has occurred; and
in response to determining that an event has occurred, broadcasting the event.

7. A method comprising:
identifying, by a cloud delivery platform comprising at least one memory module and at least one processor that executes a plurality of components, a cloud deployment element of a cloud deployable offering;
identifying, by the cloud delivery platform, a cloud deployment unit to support deployment of the cloud deployment element;
defining, by the cloud delivery platform, a cloud deployment policy to build, deliver, and manage the cloud deployable offering at a level of service;
generating, by the cloud delivery platform, a cloud deployment manifest comprising an identifier associated with the cloud deployment element, an identifier associated with the cloud deployment unit, and the cloud deployment policy, the cloud deployment manifest further comprising a type of the cloud deployment element, a role associated with the cloud deployment element, a quantity of the cloud deployment element to be deployed, a software package to be utilized by the cloud deployment element, and a plurality of types of provisioning enabled for the cloud deployable offering, wherein the plurality of types of provisioning comprise an initial provisioning for an initial deployment of the cloud deployable offering, an elastic event provisioning allowing the cloud deployable offering to be scaled up or scaled down based on demand, and a recovery provisioning allowing the cloud deployable offering to return to a previous state to recover from a failure, wherein the cloud deployment manifest further comprises, for each of the plurality of types of provisioning enabled for the cloud deployable offering, a corresponding type of process to be used to perform each of the plurality of types of provisioning, and wherein the corresponding type of process used to perform the initial provisioning comprises a stick deploy process and the corresponding type of process used to perform the elastic event provisioning and the recovery provisioning comprises a snapshot restore process;
ordering, by the cloud delivery platform, from a cloud orchestrator, a resource to be utilized by the cloud deployable offering, the resource associated with the cloud deployment unit identified in the cloud deployment manifest;
receiving, by the cloud delivery platform, access to the resource;
distributing, by the cloud delivery platform, the cloud deployment element to the resource associated with the cloud deployment unit; and
configuring, by the cloud delivery platform, the cloud deployment element on the cloud deployment unit in preparation for deployment of the cloud deployable offering.

8. The method of claim 7, further comprising managing, by the cloud delivery platform, the cloud deployable offering to ensure that the cloud deployable offering meets the level of service.

9. The method of claim 8, wherein managing, by the cloud delivery platform, the cloud deployable offering to ensure that the cloud deployable offering meets the level of service comprises:
detecting an event; and
responding to the event by performing a function to return the cloud deployable offering to the level of service.

10. The method of claim 9, wherein the function to return the cloud deployable offering to the level of service comprises generating an order directed to the cloud orchestrator to order additional resources to return the cloud deployable offering to the level of service.

11. The method of claim 9, wherein the function to return the cloud deployable offering to the level of service comprises:
installing a patch to the cloud deployable offering;
upgrading the cloud deployable offering;
relocating the cloud deployable offering from resources including the resource to new resources and provisioning the cloud deployable offering on the new resources;
performing a recovery deployment to return the cloud deployable offering to a previous state in which the level of service is met; or
re-provisioning the cloud deployable offering on the resources.

12. A computer storage medium having instructions stored thereon that, when executed by at least one processor of a cloud delivery platform, cause the at least one processor to perform operations comprising:
identifying a cloud deployment element of a cloud deployable offering;
identifying a cloud deployment unit to support deployment of the cloud deployment element;
defining a cloud deployment policy to build, deliver, and manage the cloud deployable offering at a level of service;
generating a cloud deployment manifest comprising an identifier associated with the cloud deployment element, an identifier associated with the cloud deployment unit, and the cloud deployment policy, the cloud deployment manifest further comprising a type of the cloud deployment element, a role associated with the cloud deployment element, a quantity of the cloud deployment element to be deployed, a software package to be utilized by the cloud deployment element, and a plurality of types of provisioning enabled for the cloud deployable offering, wherein the plurality of types of provisioning comprise an initial provisioning for an initial deployment of the cloud deployable offering, an elastic event provisioning allowing the cloud deployable offering to be scaled up or scaled down based upon demand, and a recovery provisioning allowing the cloud deployable offering to return to a previous state to recover from a failure, wherein the cloud deployment manifest further comprises, for each of the plurality of types of provisioning enabled for the cloud deployable offering, a corresponding type of process to be used to perform each of the plurality of types of provisioning, and wherein the corresponding type of process used to perform the initial provisioning comprises a stick deploy process and the corresponding type of process used to perform the elastic event provisioning and the recovery provisioning comprises a snapshot restore process;
receiving an order to deploy an instance of the cloud deployable offering;
ordering, from a cloud orchestrator, a resource to be utilized by the cloud deployable offering, the resource associated with the cloud deployment unit identified in the cloud deployment manifest;
receiving access to the resource;

distributing the cloud deployment element to the resource associated with the cloud deployment unit; and configuring the cloud deployment element on the cloud deployment unit in preparation for deployment of the cloud deployable offering.

13. The computer storage medium of claim 12, wherein the operations further comprise managing the cloud deployable offering to ensure that the cloud deployable offering meets the level of service.

14. The computer storage medium of claim 13, wherein managing the cloud deployable offering to ensure that the cloud deployable offering meets the level of service comprises:

detecting an event; and responding to the event by performing a function to return the cloud deployable offering to the level of service.

15. The computer storage medium of claim 14, wherein the function to return the cloud deployable offering to the level of service comprises:

installing a patch to the cloud deployable offering;

upgrading the cloud deployable offering;

relocating the cloud deployable offering from resources including the resource to new resources and provisioning the cloud deployable offering on the new resources;

performing a recovery deployment to return the cloud deployable offering to a previous state in which the level of service is met; or re-provisioning the cloud deployable offering on the resources.

* * * * *